United States Patent [19]

Mackrle et al.

[11] 4,430,215
[45] Feb. 7, 1984

[54] ARRANGEMENT FOR BIOLOGICAL CLEANING OF WATER

[75] Inventors: Svatopluk Mackrle, Brno; Vladimír Mackrle, Prague; Oldřich Dračka, Brno, all of Czechoslovakia

[73] Assignee: Agrotechnika, narodny podnik podnikove riaditelstvo, Zvolen, Czechoslovakia

[21] Appl. No.: 362,302

[22] Filed: Mar. 26, 1982

[30] Foreign Application Priority Data

Apr. 2, 1981 [CS] Czechoslovakia ............... 2484-81

[51] Int. Cl.$^3$ .................... C02F 1/72; C02F 3/20; C02F 3/22
[52] U.S. Cl. .................... 210/195.4; 210/202; 210/220; 210/261
[58] Field of Search ............ 210/195.4, 199, 202, 210/220, 256, 261, 715; 261/DIG. 75

[56] References Cited

U.S. PATENT DOCUMENTS

| | | | |
|---|---|---|---|
| 3,307,702 | 3/1967 | Mackrle et al. | 210/256 X |
| 3,339,741 | 9/1967 | Bernard et al. | 210/195.4 |
| 3,355,023 | 11/1967 | Foster | 210/195.4 |
| 3,385,786 | 5/1968 | Klock | 210/261 X |
| 3,403,096 | 9/1968 | Mackrle et al. | 210/202 X |
| 3,429,442 | 2/1969 | Mackrle et al. | 210/202 |
| 3,524,810 | 8/1970 | Mackrle et al. | 210/715 |
| 3,804,255 | 4/1974 | Speece | 261/DIG. 75 |
| 3,815,750 | 6/1974 | Mackrle et al. | 210/202 |
| 3,834,540 | 9/1974 | Bernard | 210/195.4 X |
| 3,959,144 | 5/1976 | Mackrle et al. | 210/261 X |
| 4,008,153 | 2/1977 | Mackrle et al. | 210/261 X |
| 4,040,963 | 8/1977 | Garrott, Jr. | 210/220 X |
| 4,054,524 | 10/1977 | Mackrle et al. | 210/220 X |
| 4,139,457 | 2/1979 | Mackrle et al. | 210/261 X |
| 4,341,630 | 7/1982 | Mackrle et al. | 210/221.2 |

FOREIGN PATENT DOCUMENTS

| | | | |
|---|---|---|---|
| 2803680 | 8/1978 | Fed. Rep. of Germany | 210/195.4 |
| 2034683 | 6/1980 | United Kingdom | 210/195.4 |

*Primary Examiner*—Robert H. Spitzer

[57] ABSTRACT

Arrangement for the biological cleaning of water, said arrangement being suitable for large urban stations for cleaning sewage or for the cleaning of waste waters of industrial plants. The arrangement comprises an activating system with pneumatic aeration and a separating system communicating therewith, the arrangement operates on the basis of fluid filtration and automatic return of activated sludge into the activating system by gravitation. Suitable partition walls in a large container form a number of part activating spaces and part separating spaces; by suitable interconnections, by rectifying walls, by the supply of raw water, and by aeration a convenient streaming flow of the liquid and an advantageous operation of the arrangement are obtained.

14 Claims, 5 Drawing Figures

ARRANGEMENT FOR BIOLOGICAL CLEANING OF WATER

BACKGROUND OF THE INVENTION

The invention relates to an arrangement for the biological cleaning of water, which is particularly suitable for large urban cleaning stations or for the cleaning of waste water for industrial plants. The arrangement comprises an activating system with pneumatic aeration and with a supply of raw water and a separating system communicating therewith; the arrangement operates on the basis of fluid filtration, with an automatic return of activated sludge into the activating system and with the removal of cleaned water.

Biological activation, separation of activated sludge, and the return of a part of the activated sludge into the activation zone are generally used for the biological activation of waste waters. Arrangements operating on this principle apply a separated activation and separation; the separation is accomplished by sedimentation and return of the activated sludge by pumping. In small and medium cleaning stations of waste waters these arrangements are replaced by substantially more effective arrangements, in which separation of the activated sludge is accomplished by fluid filtration and the return of the activated sludge into the activation proceeds automatically by gravitation. Known arrangements of this kind are, however, limited in their size by their disposition and construction. Large cleaning stations of waste waters, for instance of fecal waters for outputs of the order above $10^3$ equivalent inhabitants, are at present built as classical arrangements. The common drawbacks of classical arrangements are a large floor space and volume of special sedimentation containers, their demanding machinery, and their complicated interconnection. These factors thereafter reflect unfavorably in investment costs and the demands for floor space for large cleaning stations of waste water.

SUMMARY OF THE INVENTION

It is an object of this invention to eliminate or at least substantially to reduce the above-described drawbacks. According to this invention, part activating spaces and part separating spaces are created in a container formed by circumferential walls and a bottom by a system of couples of inserted partition walls arranged in parallel in a horizontal direction and converging in a downward direction, whereby at least one lower edge of one partition wall of a couple forms with the opposite part of the adjacent partition wall of this couple a passage for mutual communication between part activating spaces on one side and part separating spaces on the other side. A channel thus forms a continuation of each passage, said channel being formed both by an inserted wall, extending beyond the level of the passage in both directions, and by the opposite part of the longitudinal partition wall, whereby the part activating spaces are mutually interconnected on their front ends by transistory passages.

A solution according to this invention which is particularly advantageous from the point of view of construction is one wherein the system of inserted parallel arranged longitudinal partition walls, which converge in the downward direction, form a self-supporting construction as a unit and/or part of a unit.

It is advantageous for good operation if in each part separation space there is provided a bubble collector, the lower end of which extends above said passage affording mutual communication.

In order to protect the container from temperature variations, it is closed in its upper part by at least one longitudinal arcuate value which forms the extension of some of the longitudinal partitions walls or representing their continuation.

An arrangement according to this invention is advantageous wherein the walls and the bottom are made as building elements, for instance as a reinforced concrete system, and the longitudinal partition walls, and possibly also the inserted walls and also the bubble collector, are made of metal and/or as elements made of plastic material.

The transitory passages can be formed by air lift pumps or air lift pumps can be inserted into these transistory passages.

A solution according to this invention is advantageous wherein rectifying walls form part of the transistory passages, the free ends of which rectifying walls entend into part activating spaces substantially opposite to the direction of the stream of flowing liquid.

According to another alternative, at least that the couple of partition walls, the lower edge of which forms a passage with the opposite part of the second partition wall of this couple, has a profiled cross section, for instance of an undulate shape, so that it forms a system of troughs oriented in the direction toward the passage; alternatively the inserted wall is in contact with the adjacent tone of the profiled partition wall.

The solutions according to this invention complement advantageously by their parameters the set of known arrangements applying fluid filtration, and enable the extension of the application of the technology of biological cleaning of water by low load activation with simultaneous stabilization of sludge also for cleaning stations of a size of the order of $10^4$ equivalent inhabitants. A specific feature of this technology is the achievement of a stabilization of the generated biological sludge without the need of the application of separate anaerobic sludge digestion, and also the achievement of an increased efficiency of water cleaning, particularly as regards the removal of nitrogen compounds.

By the combination of the activating and separating spaces in a single container substantial savings of required floor space are achieved as compared to so-called classical cleaning stations.

The relatively low height of the arrangement permits it to be situated practically or completely at the level of the terrain.

The closed activating space, together with the possibility of its covering by a vault, enables also the building of larger cleaning stations of waste water as compact objects; the coverage of the whole object by vaults also contributes to its aesthetic appearance.

The mutual interconnection of adjacent parts of the activating space and the longitudinal streaming of fluid therein secures a uniform distribution of sludge, returned from individual separating spaces and thus also the homogeneity of the activating mixture. This permits the supply of raw water into the activating space practically at one point into a limited number of part activating spaces, as the longitudinal streaming generated therein distributes the supplied raw water throughout the entire space of activation. A part of the arrangement with a single supply of raw water forms an operating section; the capacity of the arrangement is in that case determined by the number and length of the sections.

If the arrangement according to this invention is completed by a denitrification, the generated nitrates can be reduced to gaseous nitrogen, and thus removal both of carbonaceous and nitrogenous material from waste water can be achieved. The arrangement operates in that case on the principle of a uniform sludge, alternately exposed to aerobic and anaerobic conditions, with which conditions the closed activating and separating spaces and coverage of the niveau of the container cooperate, thus securing minimum heat losses.

A low load of activated sludge is obtained by the high concentration of activated sludge in the activation; that is achieved both by the application of fluid filtration for separation of the activated sludge and by an optimum ratio of the surface of separation and the volume of activation.

Variations of the hydraulic load and of the material load of the separation are only apparent in the height of the fluid layer which adjusts itself automatically. The operation of the arrangement thus requires less attendance than known cleaning stations with separated separation on the principle of sedimentation with forced recirculation of sedimented sludge.

The application of the arrangement is also advantageous for the completion of reconstruction of unsatisfactory operating sewage systems of established towns, whereby building a decentralized system of cleaning stations substantial savings on sewage installations can be achieved. This holds true also for cleaning stations of towns on the seashore with a sewage system terminating into the sea through a number of sewage collecting mains.

The arrangement according to this invention is also advantageous for the cleaning of large volumes of less or medium polluted industrial waste waters from the chemical, petrochemical and food industry, particularly after chemical precleaning. The cleaning of waste waters from coking plants, of waste waters from large canneries, slaughter houses, and the like may be mentioned as examples of use of the invention.

The increased efficiency of the arrangement according to this invention represents a substantial contribution to the final goal, that is, to a cleaning of waste waters to such quality as to permit a technology with a closed circulation of used water.

DESCRIPTION OF THE DRAWINGS

An examplary embodiment of an arrangement according to this invention is shown in the attached drawings, wherein.

DESCRIPTION OF THE PREFERRED EMBODIMENT

Figure 1:
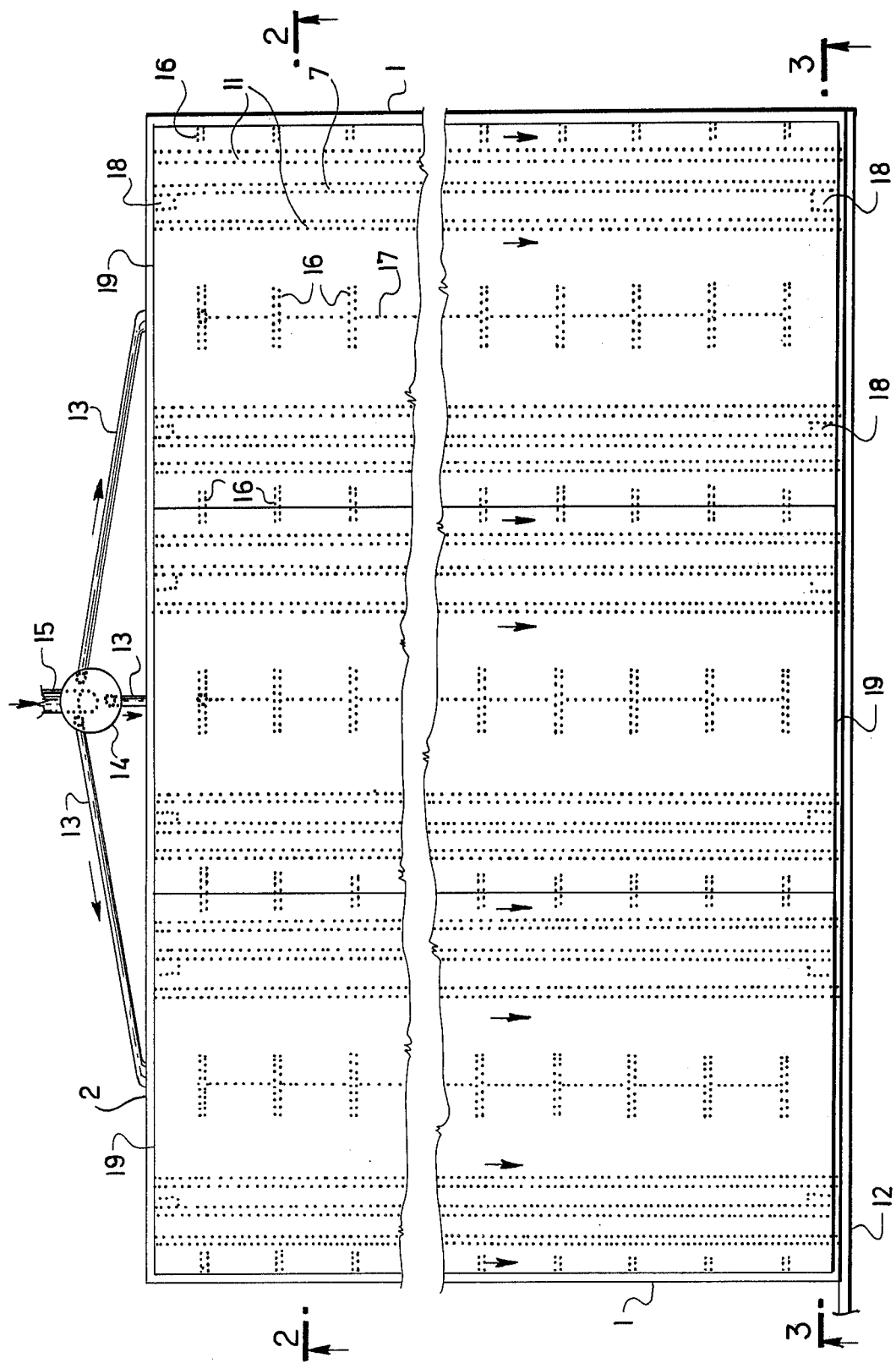
FIG. 1 is a top view of the arrangement.

As shown in FIG. 1, the arrangement has a container with a rectangular shape in top view, the container having end and side walls 1, 2 and a bottom 3, said walls and bottom being made, for example, of reinforced concrete.

Figure 2:
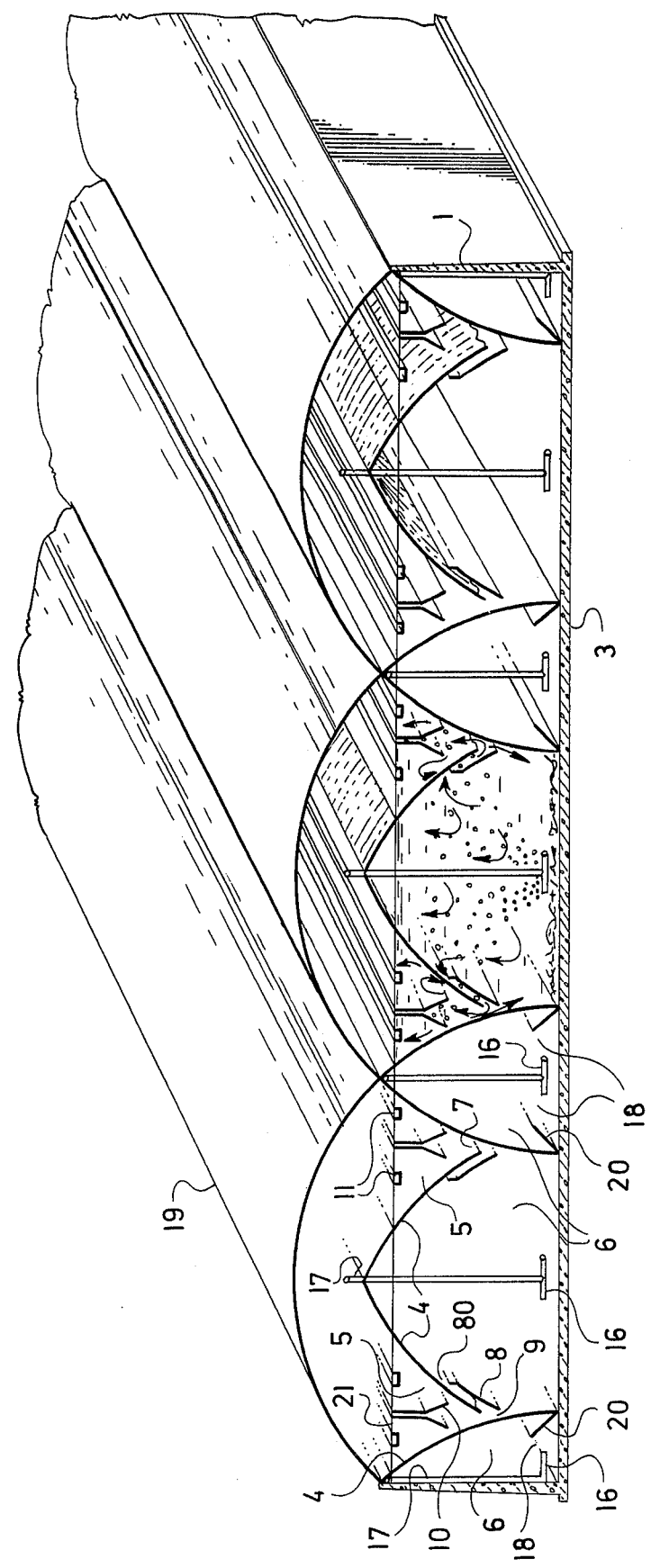
FIG. 2 is a view in vertical cross section of the arrangement, the section being taken along a plane indicated in FIG. 1 by the line 2—2.
Figure 3:
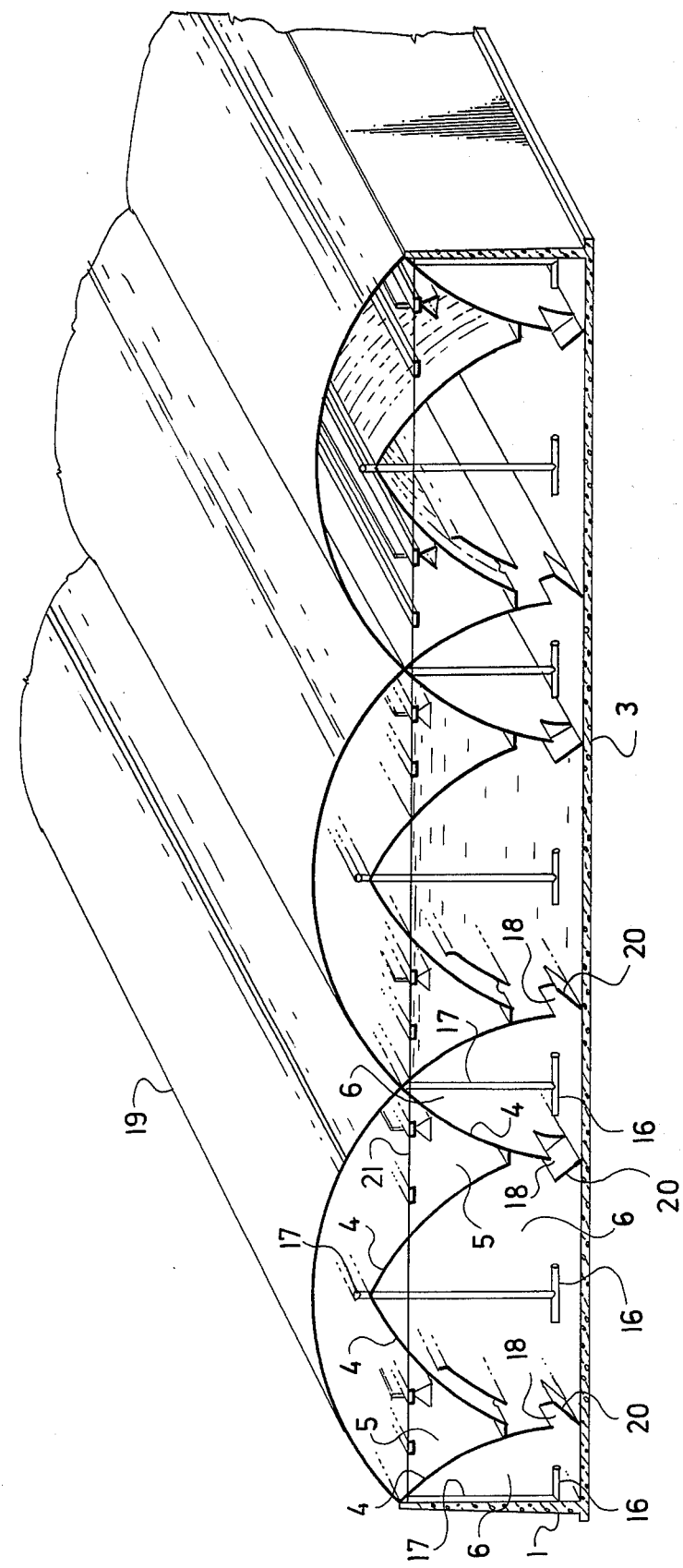
FIG. 3 is a view in vertical cross section of the arrangement, the section being taken along a plane indicated in FIG. 1 by the line 3—3.

As shown in FIGS. 2 and 3, part separating spaces 5 and part activating spaces 6 are formed in this container by a system of couples of inserted parallel arranged partition walls 4, extending longitudinally in the container. The partition walls which form this couple converge in a downward direction, whereby at least the lower edge of one partition wall 4, forming a part of the couple, forms with the opposite part of the adjacent partition wall 4 of this couple a passage 7 which extends between the side walls 2 of the container and provides communication between part activating spaces 6 and part separating spaces 5.

Below passage 7 there is a longitudinally extending channel 9 formed by the lower end of an inserted wall 8, wall 8 extending vertically within wall 4. Spaces between inserted walls 8 and opposite parts of partition walls 4 are in their upper part connected with part activating spaces 6 through openings 80.

The partition walls 4 may be made of metal, possibly also of plastic material, and the container as a whole can be covered by a single or by a number of vaults or vaulted roofs 19, which may also form a continuation of some of the partition walls 4.

The arrangement shown comprises three sections, each of which is provided with a supply 13 of raw water terminating into respective part activating spaces 6, supplies 13 being connected to a distributor 14 with a main supply 15 of raw water.

The part activating spaces 6 are provided with a known aeration system comprising aerating elements 16 connected to distributing conduits 17 which are again connected to blowers (not shown).

The part activating spaces 6 are at their opposite ends interconnected by transistory passages 18 as shown in FIG. 1, in the arrangement shown there being rectifying walls 20, the free ends of which extend into part activating spaces 6 in a direction substantially opposite the direction of liquid flow. The transitory passages 18 are oriented in opposite directions at the respective side walls 2, so that a horizontal flow with lines of flow which are relatively closed is also generated in the part activating spaces 6. Air lift pumps (not shown) can also be inserted in transitory passages 18.

A discharge part (not shown) is provided in the bottom 3 of the container. The part separating spaces 5 are provided above the passages 7 with bubble collectors 10 coaxial of and having a larger radius than passages 7.

Known collecting troughs 11 (FIG. 2) connected to a common discharge channel 12, through which the cleaned water is removed from the container, are provided at the top 21 in part separating spaces 5.

Figure 4:
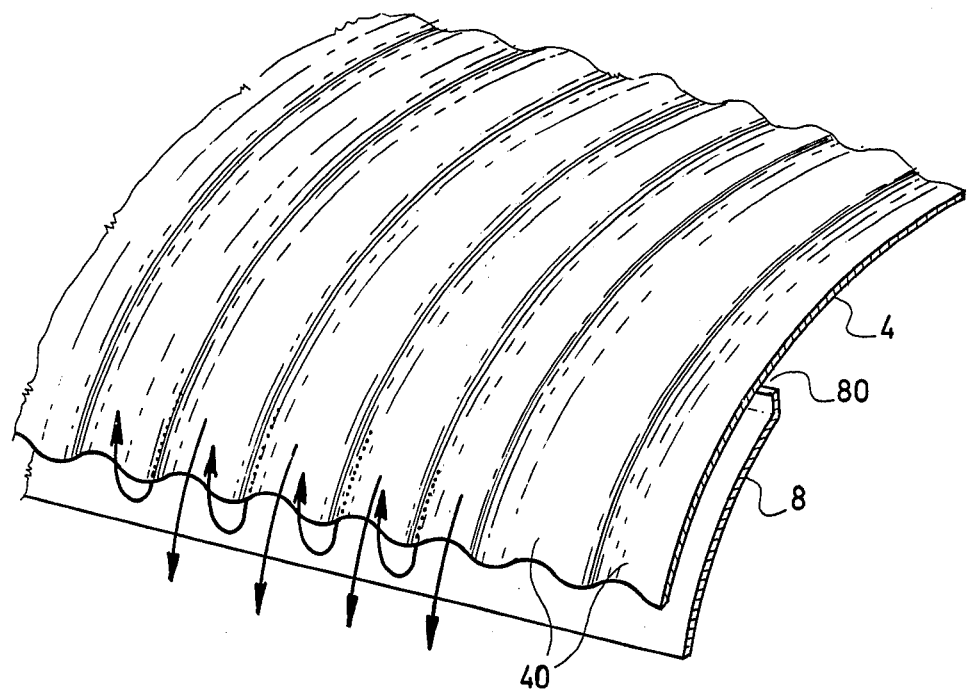
FIG. 4 is a view in an inclined direction of an arrangement of a partition wall with an undulated profile.

FIG. 4 shows an advantageous arrangement wherein at least the couple of partition walls 4, the lower edge of which forms a passage 7 with the opposite part of the second partition wall 4 of the same couple, has a suitably profiled cross section, for instance an undulated, zig-zag or similar cross section, forming a system of channels 40 oriented in direction downwards toward the passage 7.

Figure 5:
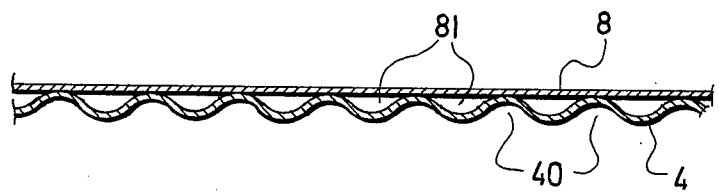
FIG. 5 is a view in end elevation of a detail of an arrangement for a through-flow, wherein the inserted wall contacts the tops of a profiled partition wall.

An arrangement shown in FIG. 5 is also advantageous wherein the inserted wall 8 is in contact with adjacent tops of profiled elements, for instance sheets.

The described arrangement of the container comprises three sections, the sections being always formed by two adjacent part separating spaces 5 with part activating spaces 6 situated below of the former, whereby the part activating space 6 into which the supply 13 of raw water terminates communicates directly via passages 7 with part separating spaces 5. The supply 13 of raw water can, however, as shown in FIG. 1, also terminate into some part activating space other than the middle part activating space 6.

The described arrangement operates as follows: the raw water is supplied via the main supply 15 to the distributor 14 where it is uniformly distributed to individual sections of the arrangement. An odd number of sections 1, 3, 5, for example, is advantageous. The raw water is thereafter supplied over supplies 13 to the middle part activating space 6 of each section.

The possibility of supplying raw water to one piece of each section is provided by the forced circulation in part activating spaces 6 which is achieved by their interconnection by transitory passages 18 at the circumferential or side walls 2, as already mentioned. The flow through transitory passages 18 is secured by the insertion of rectifying walls 20 in front of these transitory passages 18 in part activating spaces 6. The transverse circulating flow in the part activating spaces 6 generated by aeration of the activating mixture is rectified by rectifying walls 20 to the transitory passages 18.

The required homogeneity of the activating mixture is secured even with large dimensions of the arrangement by the longitudinal flow in part activating spaces 6, thus permitting the design of large arrangements of a length of several tens of meters with a large number of sections situated side-by-side. Thus arrangements according to this invention even for high and highest capacities can be constructed.

The supply of air over aeration elements 16 into the activating mixture causes both a transverse circulation in part activating spaces 6 and the supply of oxygen required for known biodegrading activating processes.

The central part activating space 6 of each section is connected with separating spaces 5 by passages 7, in front of which a channel 9 is provided to prevent any transmission of transverse circulation flow in the part activating space 6 to the part separating space 5.

Due to removal of cleaned water from part separating spaces 5 through collecting troughs 11 and due to the flow of the activating mixture in the middle activating spaces 6, the activating mixture enters the spaces between inserted walls 8 and opposite parts of partition walls 4 via openings 80, wherefrom the activating mixture enters through passages 7 the part separating spaces 5 where it is subject to fluid filtration.

The bubble collectors 10 collect fine bubbles which are separated on the lower edge of the partition walls 4. The activated sludge retained in the fluid filter in the part separating spaces 5 automatically falls back through the passage 7 and the channel 9 into the part activating space 6.

In the construction shown in FIGS. 4 and 5, where the outline of the passage 7 is divided into a system of channels 40, an improvement of the efficiency of separation is obtained which is shown in the material surface load i.e. for each square meter of the surface of the activating space, in the amount of suspension retained within a time unit in the fluid filter, which has to be returned into the activating spaces. The flow of returning sludge from part separating spaces 5 is concentrated in recesses, i.e. into troughs 40. The flow of the activating mixture through part channels 81 to the channel 9 and thereafter through passage 7 to the part separating space 5 in several streams, on the other hand is determined by the length of the troughs and the cross section of the openings 80, the sludge returning to the part activating space 6 in streams between the mentioned streams of the activating mixture. Thus an advantageous separation of rising and falling streams in the lower part of the fluid filter and a stabilization of their configuration is achieved. The result is an improvement of the hydraulic efficienty of separation. The increase of the material surface load may amount to as much as about 20%.

The cleaned water is collected by collecting troughs 11 and is directed to a common discharge channel 12, which is removed to an outlet. The excess activated sludge is periodically discharged during a short time interruption of aeration through the already mentioned discharge part in the bottom 3 to a sludge bed for dewatering.

The arcuate vaults 19 which cover the container can form an extension of some partition walls 4 or form a part of them. The space above the level 21 in the container below the arcuate vaults 19 can be utilized as an access for checking the arrangement. Foot bridges (not shown) serve for this purpose.

The arrangement can be completed, if required, by a denitrification layout (not shown), advantageously in a part of the middle part activating space 6. In that case the supply of raw water has to be led to the beginning of the denitrification zone of the middle part of the activating space 6 without a supply of oxygen, and in this zone there is provided a sufficient movement of the liquid in order to prevent the settling of activated sludge, for instance by a pump or by other agitator.

The covering of the whole container together with the application of pneumatic aeration enables a reduction of heat losses and the securing of the required temperature of the activating mixture of 10° to 13° C. even in the course of operation in winter.

Another advantage of the present invention is the possibility of a relatively easy reconstruction of existing activating containers and water cleaning stations, and thus achievement of a substantial improvement of so-called classical cleaning stations.

Although the invention is illustrated and described with reference to a plurality of embodiments thereof, it is to be expressly understood that it is in no way limited to the disclosure of such preferred embodiments but is capable of numerous modifications within the scope of the appended claims.

We claim:

1. Arrangement for the biological cleaning of water, comprising an activating system having pneumatic aeration and supply of raw water and a separating system on the principle of fluid filtration with automatic return of activated sludge into the activating system, said pneumatic aeration and supply of raw water and said separating system being contained in a single vessel having a self-supporting side walls and a bottom, said activating system communicating with the separating system, the separating system having a number of part activating spaces, and the system of activating spaces having a number of separating spaces, both the system of separating spaces and the system of activating spaces being formed by a system of couples of inserted parallel arranged longitudinal partition walls converging in a downward direction, at least one lower edge of one partition wall of a couple forming with the opposite part of the adjacent partitition wall of such couple, a passage for mutual communication between part activating spaces and part separating spaces, a channel provided adjacent to said passage, said channel being formed both by an inserted wall extending vertically beyond the level of the passage in both directions and by an opposite part of the longitudinal partition wall, the part activating spaces being mutually connected at their ends by transitory passages.

2. An arrangement as claimed in claim 1, wherein the system of inserted parallel arranged and downwardly approaching partition walls form at least a part of self-supporting construction.

3. An arrangement as claimed in claim 1, comprising bubble collectors, the lower edge of each bubble collector extending above and beyond the passage between the respective part activating space and part separating space.

4. An arrangement as claimed in claim 3, wherein the longitudinal partition walls, the inserted walls, and the bubble collectors are made of metal.

5. An arrangement as claimed in claim 3, wherein the longitudinal partition walls, the inserted walls, and the bubble collectors are made of plastic material.

6. An arrangement as claimed in claim 1, comprising at least one longitudinally arranged arcuate vault which closes the upper part of the container.

7. An arrangement as claimed in claim 6, wherein the arcuate vaults form a continuation of at least some longitudinal partition walls.

8. An arrangement as claimed in claim 6, wherein the arcuate vaults form a part of some of the longitudinal partition walls.

9. An arrangement as claimed in claim 1, wherein the walls and the bottom of the container are made of reinforced concrete.

10. An arrangement as claimed in claim 1, comprising air lift pumps disposed in said transitory passages.

11. An arrangement as claimed in claim 1, wherein said transitory passages are formed by air lift pumps.

12. An arrangement as claimed in claim 1, wherein said transitory passages comprise rectifying walls the free ends of which extend into part activating spaces in a direction which is substantially opposite the direction of flow of the liquid.

13. An arrangement as claimed in claim 1, wherein at least one of a couple of partition walls, the lower edge of which forms with the opposite part of the second partition wall of this couple a passage, has a profiled cross section so that it forms a system of channels oriented toward said passage.

14. An arrangement as claimed in claim 1, wherein the inserted wall contacts adjacent tops of the profiled cross section of the partition wall.

* * * * *